United States Patent
Aoyagi et al.

(10) Patent No.: US 9,706,474 B2
(45) Date of Patent: *Jul. 11, 2017

(54) METHOD OF BARRING NETWORK ACCESS, MOBILE DEVICE AND PROCESSOR

(71) Applicant: NTT DOCOMO, INC., Tokyo (JP)

(72) Inventors: Kenichiro Aoyagi, Tokyo (JP); Mikio Iwamura, Tokyo (JP); Minami Ishii, Tokyo (JP); Mutsumi Ishimoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 14/398,738

(22) PCT Filed: May 21, 2013

(86) PCT No.: PCT/JP2013/064061
§ 371 (c)(1),
(2) Date: Nov. 4, 2014

(87) PCT Pub. No.: WO2013/176121
PCT Pub. Date: Nov. 28, 2013

(65) Prior Publication Data
US 2015/0119060 A1    Apr. 30, 2015

(30) Foreign Application Priority Data
May 22, 2012  (JP) ................... 2012-116680

(51) Int. Cl.
*H04W 48/04*    (2009.01)
*H04W 48/02*    (2009.01)
(Continued)

(52) U.S. Cl.
CPC ........... *H04W 48/04* (2013.01); *H04W 48/02* (2013.01); *H04W 48/10* (2013.01);
(Continued)

(58) Field of Classification Search
CPC ........ H04L 29/06; H04L 63/10; H04W 12/08; H04W 12/06; H04W 455/418;
(Continued)

(56) References Cited

U.S. PATENT DOCUMENTS 8,634,830 B2 *  1/2014  Christensson ........ H04W 48/02
                                                         455/418
9,084,182 B2 *  7/2015  Iwamura ............... H04W 48/16
(Continued)

FOREIGN PATENT DOCUMENTS

EP      2680644 A1      1/2014
WO   2012/063873 A1    5/2012

OTHER PUBLICATIONS

3GPP TS 36.331 V10.5.0; "3rd Generation Partnership Project; Technical Specification Group Radio Access Network; Evolved Universal Terrestrial Radio Access (E-UTRA); Radio Resource Control (RRC); Protocol specification (Release 10);" Mar. 2012 (302 pages).*

(Continued)

*Primary Examiner* — George Eng
*Assistant Examiner* — Umair Ahsan
(74) *Attorney, Agent, or Firm* — Osha Liang LLP

(57) ABSTRACT

When a network is requiring access barring, a mobile device determines whether a reference value broadcasted to the mobile device indicates a value determining that an access is denied regardless of a numerical value generated by the mobile device, or indicates a value having a possibility that an access of a certain mobile device is denied while an access of another mobile device is allowed. In the latter case, (Continued)

the mobile device determines appropriateness of an access by performing predetermined processing using the reference value as a value to be checked for a relationship with a numerical value generated by the mobile device when the mobile device does not have a special type access class, and uses a value enabling allowance of an access without performing the predetermined processing as a value for determining appropriateness of an access when the mobile device has the special type access class.

8 Claims, 15 Drawing Sheets

(51) Int. Cl.
*H04W 48/10* (2009.01)
*H04W 72/04* (2009.01)
*H04W 48/16* (2009.01)
*H04W 88/02* (2009.01)

(52) U.S. Cl.
CPC ........ *H04W 72/0486* (2013.01); *H04W 48/16* (2013.01); *H04W 88/02* (2013.01)

(58) Field of Classification Search
CPC . H04W 455/419; H04W 8/245; H04W 24/02; H04W 1/72522; H04W 48/04; H04W 88/08; H04W 48/16; H04W 8/18
See application file for complete search history.

(56) References Cited

U.S. PATENT DOCUMENTS

| | | | | |
|---|---|---|---|---|
| 9,220,056 | B2* | 12/2015 | Iwamura | H04W 48/02 |
| 2011/0058480 | A1* | 3/2011 | Dahlen | H04W 48/06 370/237 |
| 2013/0303162 | A1 | 11/2013 | Iwamura et al. | |
| 2013/0308541 | A1* | 11/2013 | Mao | H04W 48/10 370/328 |
| 2013/0324118 | A1* | 12/2013 | Iwamura | H04W 48/16 455/434 |
| 2013/0331099 | A1* | 12/2013 | Iwamura | H04W 48/02 455/434 |
| 2016/0127980 | A1* | 5/2016 | Fong | H04W 48/10 455/411 |

OTHER PUBLICATIONS

Huawei et al.; "General consideration of EAB in LTE;" 3GPP TSG-RAN WG2 Meeting #75, R2-113988; Athens, Greece; Aug. 22-26,2011 (3 pages).*
International Search Report for corresponding Inernational Application No. PCT/JP2013/064061, mailed Jun. 18, 2013 (1 page).
Written Opinion for corresponding Inernational Application No. PCT/JP2013/064061, mailed Jun. 18, 2013 (3 pages).
3GPP TS 25.321 V11.1.0; "3rd Generation Partnership Project; Technical Specification Group Radio Access Nework; Medium Access Control (MAC) protocol specification (Release 11);" Jun. 2012 (198 pages).
Huawei et al.; "General consideration of EAB in LTE;" 3GPP TSG-RAN WG2 Meeting #75, R2-113988; Athens, Greece; Aug. 22-26, 2011 (3 pages).
NTT DOCOMO, INC.; "Restriction of AC barring parameter setting;" 3GPP TSG-RAN WG2 Meeting #72, R2-106694; Jacksonville, Florida, USA; Nov. 15-19, 2010 (5 pages).
3GPP TS 25.331 V11.2.0; "3rd Generation Partnership Project; Technical Specification Group Radio Access Network; Radio Resource Control (RRC); Protocol specification (Release 11);" Jun. 2012 (1944 pages).
Extended Search Report issued in corresponding European Application No. 137936423, mailed Dec. 23, 2015 (14 pages).
Office Action issued in corresponding European Application No. 13793642.3, mailed Feb. 24, 2017 (8 pages).

* cited by examiner

METHOD OF BARRING NETWORK ACCESS, MOBILE DEVICE AND PROCESSOR

TECHNICAL FIELD

The present invention relates to a technique to bar a network access from a mobile device connectable to a radio access network.

BACKGROUND ART

In a W-CDMA network that is a conventional typical radio access system, two-stage access barring is performed as illustrated in FIG. 12. A protocol architecture of a radio interface in the W-CDMA includes a physical layer (L1), a data link layer (L2), and a network layer (L3). When a mobile device tries to access the network, first, whether an access to a cell is allowed is determined in the L3 layer of the mobile device. If allowed, next, whether use of a random access channel (RACH) is allowed is determined in the L2 layer of the mobile device.

The allowance of an access to a cell specifically means the allowance of start of a procedure of establishing a radio resource control (RRC) connection, and the allowance of use of a RACH specifically means the allowance of start of a physical RACH (PRACH) transmission procedure in the L1 layer.

The access barring in the L3 layer in the W-CDMA (see Non-Patent Literature 1) is typically performed such that a radio network control device (RNC) writes barring information in a system information block (SIB) to be broadcasted to mobile devices in accordance with the degree of congestion of the network controlled by the RNC itself. To be specific, the RNC writes, as an access class (AC) barring status, whether an access is allowed (0) or an access is denied (1) for each AC in a part called an SIB type 3 (SIB3).

Here, the access class includes normal type ACs (AC=0 to 9) and special type ACs (AC=11 to 15). As the special type ACs, for example, AC=11 is allocated to a mobile device for network operators, AC=12 is allocated to a mobile device for police services, AC=13 is allocated to a mobile device for governmental use, and AC=14 is allocated to a mobile device for emergency services. A normal type AC may be additionally allocated to the mobile device to which the special type AC is allocated.

Therefore, typically, an AC barring status in which accesses of all of the special type ACs are allowed (0), accesses of a part of the normal type ACs are allowed (0), and accesses of the rest are denied (1) is written in the SIB3. If there are 10 normal type ACs, a percentage of mobile devices barred from accessing can be changed by 10%.

For example, as illustrated in FIG. 13, nine ACs set with access-allowed (0) and one AC set with access-denied (1) are designated for 10% barring, while seven ACs set with access-allowed (0) and three ACs set with access-denied (1) are designated for 30% barring. At this time, keeping an access of the same AC denied for a long time is problematic from the standpoint of fairness of communication service. Therefore, the AC, an access of which is denied, is circulated among AC=0 to 9 with time.

The mobile device refers to the barring status corresponding to an AC to which the device itself belongs from the most recently broadcasted SIB3 before starting a establishment procedure of the RRC connection, and does not start the establishment procedure when an access being denied (1) is designated. When an access being allowed (0) is designated, the mobile device starts the establishment procedure, and proceeds in control in the L2 layer described below, accordingly.

The access barring in the L2 layer in the W-CDMA (see Non-Patent Literature 2) is such that, first, information indicating a mapping of the access class (AC) and an access service class (ASC) is described in an SIB type 5 (SIB5), as illustrated in FIG. 12, and is broadcasted to the mobile device.

For example, it is possible to correspond most preferential ACs (for example, AC=12 and 14) from among the special type ACs to ASC=0, the rest of the special type ACs (for example, AC=11 and 13) to ASC=1, and the normal type ACs (AC=0 to 9) to ASC=2. As a simple example, when the ASC has two types of 0 and 1, preferential ACs (for example, AC=12 and 14) from among the special type ACs are made corresponding to ASC=0, and the rest of the special type ACs and the normal type ACs (for example, AC=0 to 9, 11, 13, and 15) are made corresponding to ASC=1.

Then, a persistence value ($P_i$) that determines how much percentage of mobile device can use the RACH in each ASC(i) corresponding to the AC is determined based on a persistence level (N) described in an SIB type 7 (SIB7) and broadcasted. N is a natural number of 1 to 8, and $P(N)=2^{-(N-1)}$ is determined. $P_0$ of ASC=0 is 1, $P_1$ of ASC=1 is P(N), $P_2$ of ASC=2 is $s_2 P(N)$ ($s_i$ is a number from 0 to 1, and is broadcasted with the SIB5).

FIG. 14 illustrates an operation of a mobile device in examples where the ASC has two types of 0 and 1. First, the mobile device checks which ASC the AC corresponds to from the mapping, where the own device belongs to the AC (S910), obtains the persistence value P(N) using N if ASC=1 (S920), and sets P=1 if ASC=0 (S930). For example, P(N)=½ if N=2, and P(N)=¼ if N=3.

Then, the mobile device generates a random number in a range of 0 to 1 (S940), and compares the random number with P(N) (S950). The mobile device determines an access is denied if the random number is larger than P(N) (S960), and determines an access is allowed if the random number is smaller than P(N) (S970). In a case where P=1 is set, when the random number is compared with P, it is always determined that an access is allowed (the dotted-line arrow in the drawing). The mobile device interprets the RACH can be used when having determined that an access is allowed, and starts a PRACH transmission procedure.

With the above-described control, 100% of the mobile devices having ASC=0, 25% of the mobile devices having ASC=1 in the example of N=3, and 12.5% of the mobile devices having ASC=2 where $s_2=0.5$ can access the network using the RACH. A value of N that is the basis for determining the percentage is typically determined by a radio base station (NodeB) that performs measurement of a load in a cell of the own station, and is described in the SIB7.

As described above, in the network of W-CDMA, the congestion of the network has been overcome by a mechanism in which the L3 layer and the L2 layer perform two-stage access barring. However, in a next-generation Long Term Evolution (LTE), the mechanism is integrated into access barring in the L3 layer.

Note that the access barring in the L3 layer in the W-CDMA circulates the AC to be barred with time, as illustrated in FIG. 13. Therefore, it is necessary to periodically change the AC barring status broadcasted with the SIB3. In a case where the AC barring status is changed in every several tens of seconds in order to maintain the fairness of communication service, for example, when a paging message that indicates the change of the content of the SIB3 is repeatedly transmitted during a predetermined period so that the change is passed on to all of the mobile devices, it soon gets to a next change point, and there is a high possibility of almost steadily transmitting the paging message. If so, there is a problem that a mobile device that needs to almost steadily receive the paging message may burn battery power.

To solve this problem, in the access barring in the L3 layer in the LTE (see Non-Patent Literature 3), the appropriateness of an access is determined by comparison with a random number generated by the mobile device by following the access barring in the L2 layer in the W-CDMA.

This is because, when 30% barring is desired, for example, if a value indicating "70%" is broadcasted at the beginning of a barring period, the mobile device then compares the value with a random number, so that it is determined that an access is allowed by the probability of 70% (70% from among the mobile devices in the cell), and it is determined that an access is denied by the probability of 30% (30% from among the mobile device in the cell), whereby frequent change of the broadcast information becomes unnecessary. Note that, for this purpose, the LTE broadcasts information for designating values at 5% intervals from 0 to 95% instead of broadcasting the persistence level (N) like the W-CDMA.

In following the mechanism of the access barring in the L2 layer in the W-CDMA in this way, a mechanism in which an access is always allowed if ASC=0 and the appropriateness of an access is determined according to the comparison with a random number if ASC=1 is introduced as it is. Therefore, in the LTE system, the operation illustrated in FIG. 15 is performed in the mobile device.

In the access barring of the LTE, whether each AC corresponds to ASC=0, in which the AC is not subjected to barring, or to ASC=1, in which the AC is subjected to barring, is broadcasted as information of ac-BarringForSpecialAC. Note that the normal type ACs (AC=0 to 9) cannot correspond to ASC=0, and therefore, broadcasted information is information regarding special type ACs (AC=11 to 15).

That is, in the LTE system, information of designating no barring (0) for preferential ACs (for example AC=12 and 14) from among the special type ACs, and of designating barring (1) for the rest of the special type ACs and the normal type ACs (for example, AC=0 to 9, 11, 13, and 15) is broadcasted.

Further, in the access barring of LTE, the mobile device having an AC subjected to barring broadcasts information of ac-BarringFactor as information for designating values to be compared with a random number (values at 5% intervals from 0 to 95%).

The mobile device that has received the information then proceeds to Yes at S1010 and determines accesses of the ACs among the special type ACs, in which 0 is designated (for example, AC=12 and 14), are allowed (S1050), and proceeds to No at S1010 and generates random numbers of the ACs from among the special type ACs, in which 1 is designated, and the normal type ACs (for example, AC=0 to 9, 11, 13, and 15) (S1020) by the ac-BarringForSpecialAC, as illustrated in FIG. 15. If the generated random number is smaller than the value designated by the ac-BarringFactor (Yes at S1030), it is determined that an access is allowed (S1050), and if the generated random number is larger than the value designated by the ac-BarringFactor (No at S1030), it is determined that an access is denied (S1040).

PRIOR ART DOCUMENT

Non-Patent Document

Non-patent document 1: 3GPP TS25.331
Non-patent document 2: 3GPP TS25.321
Non-patent document 3: 3GPP TS36.331

SUMMARY OF THE INVENTION

The above-described network access barring in LTE, an AC from among the special type ACs, in which 1 is designated, and the normal type AC are subjected to barring according to the comparison with a random number at the completely same rate.

However, originally, the special type AC is provided as an AC to be always preferentially handled compared with the normal type AC. That is, in the W-CDMA, first, an access of the special type AC is always allowed in the L3 layer, and an access of the normal type AC may be allowed and denied in a manner to periodically change the AC, an access of which is allowed.

Then, in the W-CDMA, the access barring in the L2 layer is performed after going through the difference in handling in the above-described L3 layer. Therefore, in the mechanism in which an access is always allowed if ASC=0 and the appropriateness of an access is determined by comparison with a random number if ASC=1, if a preferential AC from among the special type ACs is made corresponding to ASC=0 and the rest of the special type ACs and the normal type AC are made corresponding to ASC=1, the rest ACs other than the preferential AC from among the special type ACs are always preferentially handled compared with the normal type AC.

That is, in the W-CDMA, while the rest ACs other than the preferential AC from among the special type ACs proceed to the processing of L2 layer without being subjected to the access barring in the L3 layer (with being handled such that accesses are always allowed), similarly to the preferential AC, the normal type ACs are subjected to the barring in which accesses thereof are periodically denied in the L3 layer, and only the AC, an access of which has been allowed, proceeds to the processing of the L2 layer. Therefore, even if the AC is subjected to the barring in the L2 layer at the same rate where ASC=1, the special type AC gets preference over the normal type AC in the L3 layer. Therefore, any of the special type ACs is always preferentially handled compared with the normal type AC.

Furthermore, in an actual operation of the network, if the access barring is provided in the L3 layer in accordance with the congestion state of the network, a shortage of the resource of the RACH in the L2 layer is less likely to happen, and therefore even if the same barring is provided in the L2 layer, there is a profound effect of the preference if preference is given in the L3 layer.

Further, in the W-CDMA, a difference in handling can be provided in the L2 layer, in which a particularly preferential AC from among the special type ACs is made corresponding to ASC=0, the rest of the special type ACs is made corresponding to ASC=1, and the normal type ACs are made corresponding to ASC=2.

As described above, while the original purpose is realized in the access barring in the W-CDMA, in which the special type AC is always preferentially handled compared with the normal type AC, LTE has followed the mechanism of the access barring in the L2 layer in the W-CDMA as it is when being integrated into the access barring in the L3 layer, and therefore, the AC subjected to barring from among the special type ACs and the normal type AC are subjected to completely the same barring, and a problem of losing the original purpose of the special type AC is caused.

An objective of the present invention is to realize network access barring in which the original purpose of the special type access class can be realized in a mobile device connected to an LTE network in view of the foregoing.

Further, the network access barring is typically realized by determining the appropriateness of an access by a mobile device using information broadcasted from the radio access network. For example, even in a case where wrong information is broadcasted due to malfunction of the network or information is broadcasted in a different operation by a roaming destination network, it is desirable to realize the access barring in which a mobile device having a special type access class is always preferentially handled by a proper operation by the mobile device itself, and realization of such a mobile device is an objective of the present invention.

A method of barring a network access according to a principle of the present invention is performed in a mobile device connectable to a radio access network. Each mobile device connectable to the radio access network belongs to at least one of access classes, the access classes include a special type access class and a normal type access class, broadcast information to be broadcasted to each mobile device from the radio access network includes barring information for barring an access to the network, and the barring information includes first barring information for designating whether a mobile device in each access class is subjected to access barring, and second barring information indicating a value serving as a reference for determining appropriateness of an access according to a relationship with a numerical value generated by each mobile device. The mobile device determines whether the reference indicated by the second barring information has a possibility that an access of a certain mobile device is denied while an access of another mobile device is allowed depending on the numerical values generated by the mobile devices when establishing connection to the radio access network; when having determined to have the possibility, determines that an access is allowed when having the special type access class as an access class to which the mobile device itself belongs, and determining appropriateness of an access according to a relationship between the numerical value generated by the mobile device itself and the value serving as the reference when not having the special type access class as an access class to which the mobile device itself belongs; and when having determined not to have the possibility, determines the appropriateness of an access according to designation by the first barring information when having the special type access class as an access class to which the mobile device itself belongs, and determining that an access is denied when not having the special type access class as an access class to which the mobile device itself belongs.

According to the above-described configuration, when the second barring information that indicates the reference value that has a possibility is broadcasted, in which an access of a certain mobile device is denied while an access of another mobile device is allowed depending on the numerical values generated by the mobile devices, a mobile device having the special type access class is always determined that an access is allowed regardless of the reference value, and when the second barring information that indicates the reference value that does not have the possibility is broadcasted, a mobile device having no special type access class is always determined that an access is denied. Therefore, the mobile device having a special type access class is always preferentially handled.

Furthermore, according to the above-described configuration, when the second barring information that indicates the reference value that has a possibility is broadcasted, in which an access of a certain mobile device is denied while an access of another mobile device is allowed depending on the numerical values generated by the mobile devices, the mobile device having the special type access class is always determined that an access is allowed irrespective of the first barring information for designating whether an access of a mobile device having each access class is allowed or denied. Therefore, the mobile device having a special type access class is always preferentially handled without being influenced by an operation or a malfunction of the radio access network.

Note that the first barring information may describe whether barring is provided with respect to only the special type access class, and in that case, it can be understood that notification of the first barring information itself designates that the normal type access class is subjected to access barring.

Further, according to the above-described configuration, when the second barring information that indicates the reference value that does not have a possibility is broadcasted, in which an access of a certain mobile device is denied while an access of another mobile device is allowed depending on the numerical values generated by the mobile devices, a mobile device having no special type access class (a mobile device only belongs to a normal type access class) is always determined that an access is denied. Therefore, the mobile device can be operated even without referring to whether the first barring information has been received, where the normal type access class has access barring and the content thereof is an access being denied.

In the above-described configuration, it can be determined such that, when the value serving as the reference is a value determined that an access is denied regardless of the numerical value generated by the mobile device, the reference indicated by the second barring information is determined not to have the possibility that an access of a certain mobile device is denied while an access of another mobile device is allowed depending on the numerical values generated by the mobile devices.

Accordingly, the operation of the moving device ensures consistency, where, when the second barring information that indicates the reference value that does not have the possibility is broadcasted, in which an access of a certain mobile device is denied while an access of another mobile device is allowed depending on the numerical values generated by the mobile devices, a mobile device having no special type access class (a mobile device only belongs to a normal type access class) is always determined that an access is denied.

Further, in the above-described configuration, the value serving as the reference may be determined based on a percentage of mobile devices, accesses of which are desired to allow in the network, and the numerical value generated by each mobile device may be a number functioning as a random number.

As the number functioning as the random number, for example, a pseudo random number generated by a processor in each mobile device, a number obtained by applying processing to a value unique to each mobile device to be changed with time, and the like may be implemented. In short, if the probability of an access being allowed is different among the mobile devices having the same normal type access class, it will be a problem from the standpoint of fairness of communication service. Therefore, the number functioning as the random number mentioned here is a number that can be obtained such that, if it is continued to compare a number generated every time with the same reference value, the different mobile devices come to have similar probabilities of an access being allowed.

In the above-described configuration, the mobile device may start the establishment procedure of the RRC connection corresponding to the network in accordance with determination that an access is allowed. Accordingly, the access barring in the L3 layer becomes possible.

In the above-described configuration, the radio access network can be operated according to the LTE system.

A mobile device according to a principle of the present invention is a mobile device connectable to a radio access network, each mobile device connectable to the radio access network belonging to at least one of access classes, and the access classes including a special type access class and a normal type access class. The mobile device includes: a reception unit configured to receive broadcast information broadcasted from the radio access network; a storage unit configured to take out from the broadcast information and store barring information for barring an access to the network, and including first barring information for designating whether a mobile device in each access class is subjected to access barring, and second barring information indicating a value serving as a reference for determining appropriateness of an access according to a relationship with a numerical value generated by each mobile device; a memory unit configured to store information indicating at least one access class to which the mobile device itself belongs; a generation unit configured to select one of a plurality of possible numerical values every time generation of a numerical value is instructed, and to generate the selected value as a numerical value at the time of instruction; and a determination unit configured to determine whether the reference indicated by the second barring information has a possibility that an access of a certain mobile device is denied while an access of another mobile device is allowed depending on the numerical values generated by the mobile devices, when having determined to have the possibility, to determine that an access is allowed when the information of the memory unit indicates that the special type access class is included, and to determine appropriateness of an access according to a relationship between the numerical value generated by the generation unit and the value serving as the reference when the information of the memory unit indicates that the special type access class is not included, and when having determined not to have the possibility, to determine the appropriateness of an access according to designation by the first barring information when the information of the memory unit indicates that the special type access class is included, and to determine that an access is denied when the information of the memory unit indicates that the special type access class is not included.

With the above-described configuration, the access barring can be realized by a mobile device in which the mobile device having a special type access class is always preferentially handled without being influenced by an operation or a malfunction of the radio access network.

In the above-described configuration, a decoding unit may be further provided, which decodes the second barring information first from among the barring information stored by the memory unit, and decodes the first barring information when the reference indicated by the second barring information is determined, by the determination unit, not to have a possibility that an access of a certain mobile device is denied while an access of another mobile device is allowed depending on the numerical values generated by the mobile devices, and the information in the memory unit indicates that the special type access class is included.

Accordingly, a case of decoding the first barring information is limited, and a load of the decoding processing in the mobile device can be reduced. Furthermore, according to the above-described configuration, when the previously decoded second barring information indicates the reference value that does not have a possibility that an access of a certain mobile device is denied while an access of another mobile device is allowed depending on the numerical values generated by the mobile devices, processing of converting the decoded second barring information into a value to be actually compared with a random number can be omitted.

In the above-described configuration, the generation unit may be configured to generate the numerical value when the reference indicated by the second barring information is determined, by the determination unit, to have a possibility that an access of a certain mobile device is denied while an access of another mobile device is allowed depending on the numerical values generated by the mobile devices, and the information in the memory unit indicates that the special type access class is not included.

Accordingly, the case of generating a random number, and the like is limited, and the load of the generation processing in the mobile device can be reduced.

A processor according to a principle of the present invention is incorporated in and used by a mobile device. Each mobile device connectable to the radio access network belongs to at least one of access classes, the access classes include a special type access class and a normal type access class, broadcast information broadcasted to each mobile device from the radio access network includes barring information for barring an access to the network, and the barring information includes first barring information for designating whether a mobile device in each access class is subjected to access barring, and second barring information indicating a value serving as a reference for determining appropriateness of an access according to a relationship with a numerical value generated by each mobile device. The processor performs operations of: determining whether the reference indicated by the second barring information has a possibility that an access of a certain mobile device is denied while an access of another mobile device is allowed depending on the numerical values generated by the mobile devices when establishing connection to the radio access network; when having determined to have the possibility, determining that an access is allowed when the mobile device has the special type access class as an access class to which the mobile device itself belongs, and determining appropriateness of an access according to a relationship between the numerical value generated by the mobile device itself and the value serving as the reference when the mobile device does not have the special type access class as an access class to which the mobile device itself belongs; and when having determined not to have the possibility, determining the appropriateness of the access according to designation by the first barring information when the mobile device has the special type access class as an access class to which the mobile device itself belongs, and determining that the access is denied when the mobile device does not have the special type access class as an access class to which the mobile device itself belongs.

With the above-described configuration, the access barring can be realized by a processor to be mounted on a mobile device in which the mobile device having a special type access class is always preferentially handled without being influenced by an operation or a malfunction of the radio access network. The processor may be incorporated in the interior of the mobile device as a semiconductor chip.

Another example of a method of barring a network access according to a principle of the present invention is performed in a mobile device connectable to a radio access network and capable of establishing a communication session. Each mobile device connectable to the radio access network belongs to at least one of access classes, the access classes include a special type access class and a normal type access class, broadcast information to be broadcasted to each mobile device from the radio access network includes barring information for barring an access to the network, and the barring information includes first barring information for designating whether a mobile device in each access class is subjected to access barring, and second barring information indicating a value serving as a reference for determining appropriateness of an access according to a relationship with a numerical value generated by each mobile device. Possible values of the reference indicated by the second barring information include a first type value having a possibility that, depending on the numerical values generated by mobile devices subjected to access barring, an access of a certain mobile device is denied while an access of another mobile device is allowed, and a second type value other than the first type value.

In the above-described other example, when the reference indicated by the second barring information is the first type value, the mobile device determines appropriateness of an access or appropriateness of a session establishment by performing predetermined processing using a value indicated by the second barring information as a value to be checked for a relationship with the numerical value generated by the mobile device itself when not having the special type access class as an access class to which the mobile device itself belongs, and uses a value enabling allowance of an access or allowance of a session establishment without performing the predetermined processing as a value for determining appropriateness of an access or appropriateness of a session establishment when having the special type access class; and, when the reference indicated by the second barring information is the second type value, the mobile device determines the appropriateness of an access or the appropriateness of a session establishment based on designation by the first barring information when having the special type access class as an access class to which the mobile device itself belongs, and determines that an access is denied or a session establishment is denied when not having the special type access class.

Also according to the above-described configuration of the other example, some or all of advantageous effects described in the previously mentioned example can be achieved.

In the above-described configuration, the barring information may include barring information for determining appropriateness of an access, and barring information for determining appropriateness of a session establishment, and the mobile device may determine the appropriateness of an access based on the barring information for determining the appropriateness of an access when allowance of a session establishment is determined based on the barring information for determining the appropriateness of a session establishment. In this case, an access may be denied when denial of a session establishment is determined. (For example, the start of the establishment procedure of the RRC connection is not allowed.)

In the above-described configuration, the mobile device may start a procedure for establishing a communication session for specific service provided through the network (for example, a multimedia telephone communication session or the like) in accordance with the determination that a session establishment is allowed. Also, when plural types of specific services (for example, IMS (IP Multimedia Subsystem) voice service and IMS video service and the like) can be provided, the broadcast information may include barring information for each specific service, and the mobile device may determine appropriateness of a session establishment based on barring information corresponding to the type of service of a communication session to be started in establishment.

Thereby, a barring rate for a network access for establishing a communication session for specific service can be different from a barring rate for a network access involved in other services, and, in each barring, a mobile device having the special type access class can be always preferentially handled.

Another example of a mobile device according to a principle of the present invention is a mobile device connectable to a radio access network and capable of establishing a communication session, each mobile device connectable to the radio access network belonging to at least one of access classes, the access classes including a special type access class and a normal type access class. The mobile device includes: a reception unit configured to receive broadcast information broadcasted from the radio access network; a storage unit configured to take out from the broadcast information and store barring information for barring an access to the network, and including first barring information for designating whether a mobile device in each access class is subjected to access barring, and second barring information indicating a value serving as a reference for determining appropriateness of an access according to a relationship with a numerical value generated by each mobile device; a memory unit configured to store information indicating at least one access class to which the mobile device itself belongs; and a generation unit configured to select one of plural possible numerical values every time generation of a numerical value is instructed, and to generate the selected value as a numerical value at the time of instruction.

The mobile device according to the above-described other example further includes a determination unit configured to, when the reference indicated by the second barring information is a first type value having a possibility that, depending on the numerical values generated by mobile devices subjected to access barring, an access of a certain mobile device is denied while an access of another mobile device is allowed, determine appropriateness of an access or appropriateness of a session establishment by performing predetermined processing using a value indicated by the second barring information as a value to be checked for a relationship with the numerical value generated by the generation unit when the information of the memory unit indicates that the special type access class is not included, and use a value enabling allowance of an access or allowance of a session establishment without performing the predetermined processing as a value for determining appropriateness of an access or appropriateness of a session establishment when the information of the memory unit indicates that the special type access class is included, and the determination unit configured to, when the reference indicated by the second barring information is a second type value other than the first type value, determine the appropriateness of an access or the appropriateness of a session establishment based on designation by the first barring information when the information of the memory unit indicates that the special type access class is included, and determine that an access is denied or a session establishment is denied when the information of the memory unit indicates that the special type access class is not included.

Another example of a processor according to a principle of the present invention is incorporated in and used by a mobile device. Each mobile device connectable to a radio access network and capable of establishing a communication session belongs to at least one of access classes, the access classes include a special type access class and a normal type access class, broadcast information to be broadcasted to each mobile device from the radio access network includes barring information for barring an access to the network, and the barring information includes first barring information for designating whether a mobile device in each access class is subjected to access barring, and second barring information indicating a value serving as a reference for determining appropriateness of an access according to a relationship with a numerical value generated by each mobile device. Possible values of the reference indicated by the second barring information include a first type value having a possibility that, depending on the numerical values generated by mobile devices subjected to access barring, an access of a certain mobile device is denied while an access of another mobile device is allowed, and a second type value other than the first type value.

The processor according to the above-described other example performs operations of: when the reference indicated by the second barring information is the first type value, determining appropriateness of an access or appropriateness of a session establishment by performing predetermined processing using a value indicated by the second barring information as a value to be checked for a relationship with a numerical value generated by the mobile device itself when not having the special type access class as an access class to which the mobile device itself belongs, and using a value enabling allowance of an access or allowance of a session establishment without performing the predetermined processing as a value for determining appropriateness of an access or appropriateness of a session establishment when having the special type access class; and, when the reference indicated by the second barring information is the second type value, determining the appropriateness of an access or the appropriateness of a session establishment based on designation by the first barring information when having the special type access class as an access class to which the mobile device itself belongs, and determining that an access is denied or a session establishment is denied when not having the special type access class.

Note that each invention of the above-described method of barring a network access can be established as an invention of a mobile device and an invention of a processor used in a mobile device. Further, each invention of the above-described mobile device can be established as an invention of a method of barring a network access and an invention of a processor used in a mobile device.

MODE FOR CARRYING OUT THE INVENTION

Hereinafter, embodiments of the present invention will be described with reference to FIGS. 1 to 6.

Figure 1:
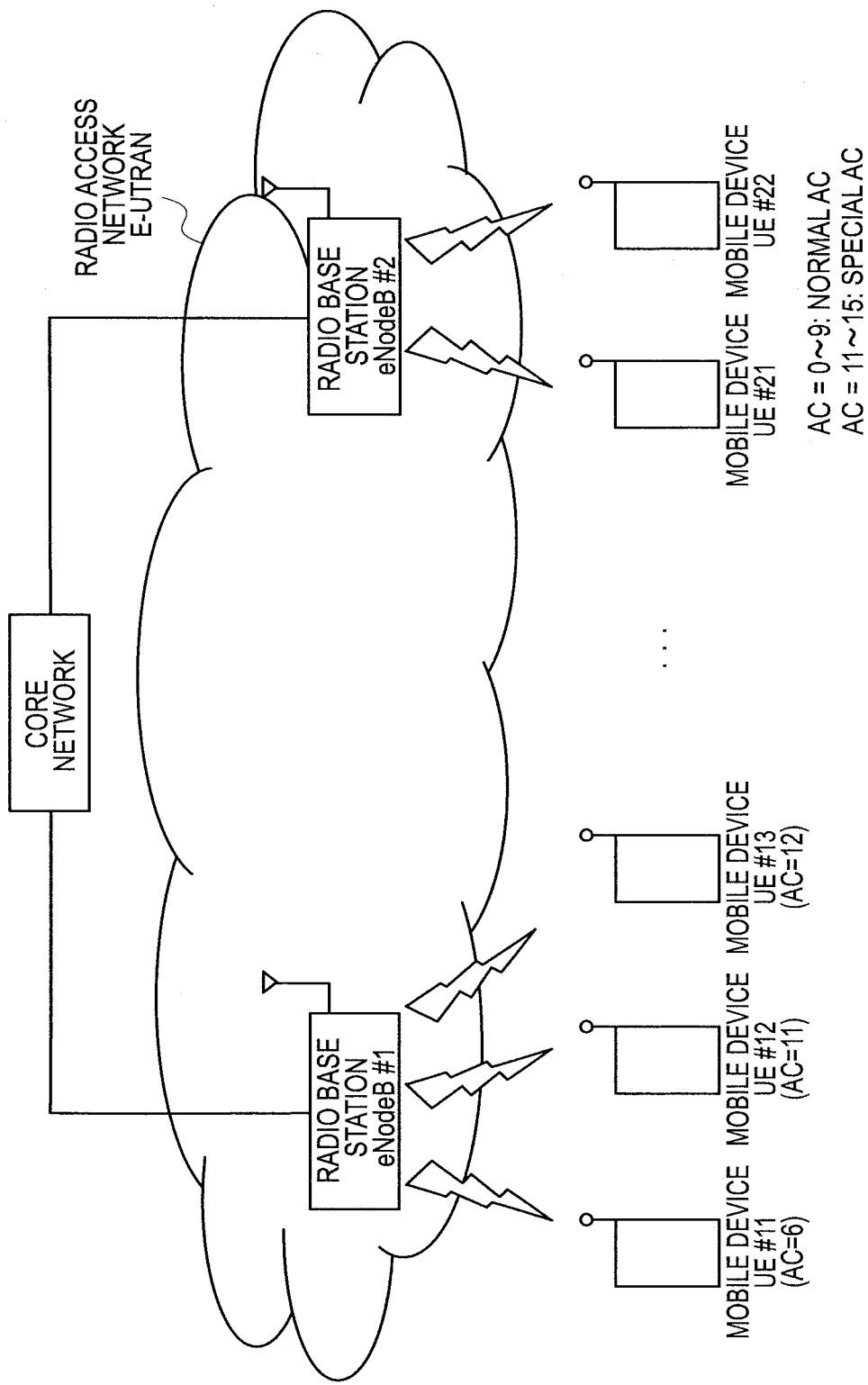
FIG. 1 is an overall configuration diagram of an example of a radio network system to which the present invention is applicable.

FIG. 1 is a diagram illustrating an overall configuration of an LTE radio network system. The LTE radio access network is called E-UTRAN, and is located between a core network and a mobile device user equipment (UE). The E-UTRAN is configured such that a plurality of eNodeBs that function as a radio base station and a radio network control device is arranged.

In the example of FIG. 1, normal type access classes (normal AC) are AC=0 to 9, special type access classes (special AC) are AC=11 to 15, a UE#11 belongs to AC=6 (normal), a UE#12 belongs to AC=11 (special: for operators), and a UE#13 belongs to AC=12 (special: for police services). The UE#12 and UE#13 may have AC=5 and 3 (normal) respectively, in addition to AC=11 and 12, for example. If they have special ACs, existence and a form of access barring can be determined regardless of which normal AC they belong to.

Figure 2:
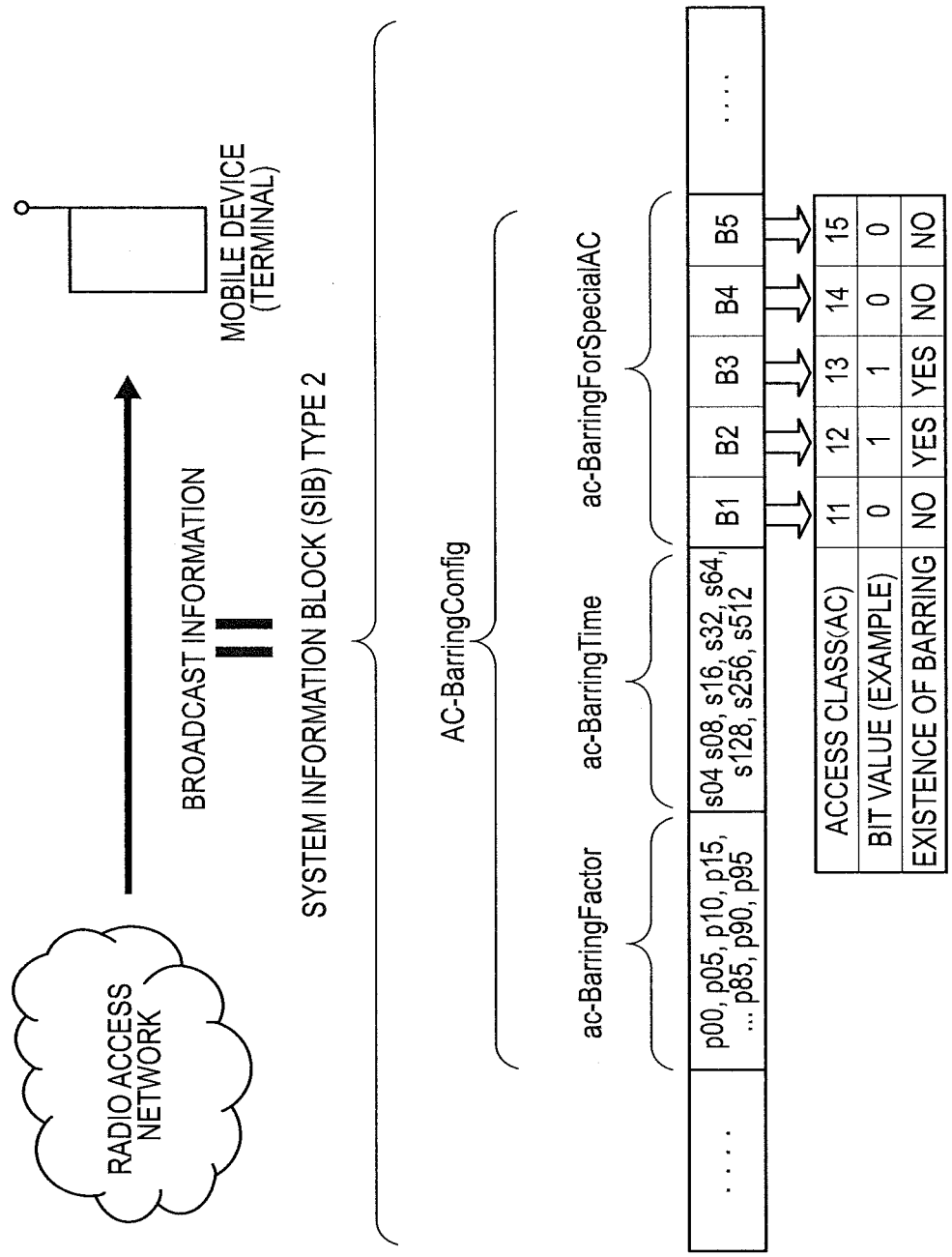
FIG. 2 is a diagram illustrating an example of information to be broadcasted to a mobile device from an LTE radio access network.

Information broadcasted from an E-UTRAN to a UE of FIG. 1 through a broadcast channel includes information called SIB2 as illustrated in FIG. 2, and further includes barring information called AC-BarringConfig therein. The inclusion of AC-BarringConfig can be understood that the radio access network is in a state of requiring some sort of access barring.

Figure 3:
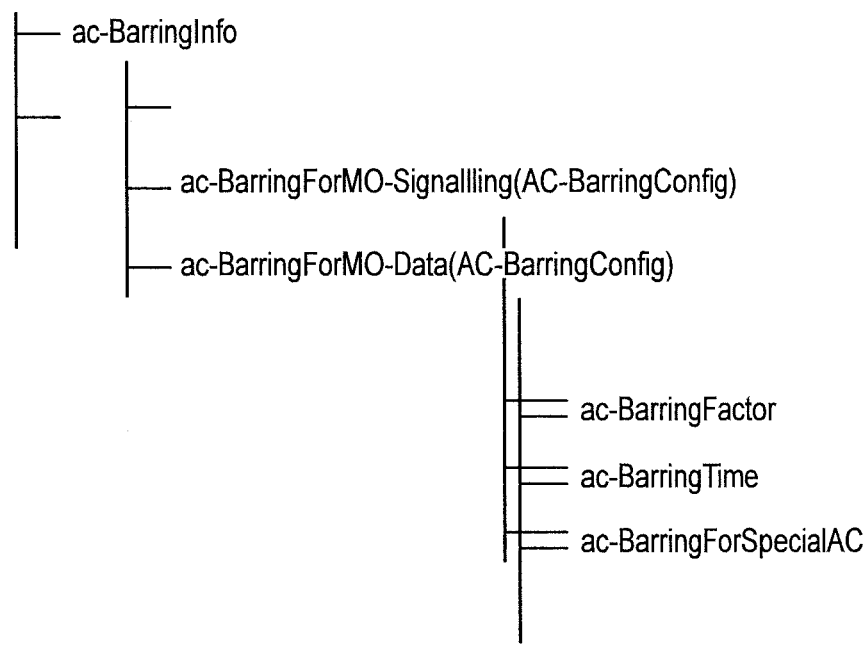
FIG. 3 is a diagram illustrating an example of a more detailed configuration of the information of FIG. 2.

To be specific, as illustrated in FIG. 3, an information element of ac-BarringInfo can be included in the SIB2, and any one of or both of ac-BarringForMO-Signalling (an information element referred to when RRC connection for signaling generated by a mobile device is set) and ac-BarringForMO-Data (an information element referred to when RRC connection for call generated by a mobile device is set) can be further included therein.

Both of the ac-BarringForMO-Signalling and the ac-BarringForMO-Data include the AC-BarringConfig. Therefore, when it is detected that the ac-BarringInfo and the ac-BarringForMO-Signalling, or the ac-BarringInfo and the ac-BarringForMO-Data are included in a mobile device that has received the SIB2, it can be determined that the barring information (AC-BarringConfig) is included.

A structure of the information of the AC-BarringConfig can be defined by ASN.1 (abstract syntax notation 1), and includes three elements: (1) ac-BarringFactor (an example of second barring information), (2) ac-BarringTime, and (3) ac-BarringForSpecialAC (an example of first barring information). These three elements are described in a sequence type (SEQUENCE), and are described in the order of (1), (2), and (3) because the order of appearance of the elements has importance.

The (1) is information for designating values at 5% intervals between 0 and 95%: p00, p05, p10, p15, p20, . . . , p85, p90, and p95. This information is described in an enumerated type (ENUMERATED). Therefore, first, the information is converted into a numerical value that serves as a value to be actually compared with a random number, and is then subjected to comparison processing with a random number described below.

The (2) is information for designating values of s4, s8, s16, s32, . . . , s256, and s512, and when establishment of the RRC connection cannot be started due to access barring, the values serve as the basis to calculate numerical values to be set in a timer that determines how long the establishment of the RRC connection is prohibited.

The (3) is a bit sequence, and is composed of five bits corresponding to AC=11 to 15. The bit value of each bit being 0 indicates there is no barring while the bit value being 1 indicates there is barring.

When a mobile device that has received the AC-BarringConfig decodes the information elements, processing of decoding content of necessary information element from among the (1), (2), and (3) can be performed by, for example, referring to a specification of the ASN.1.

Further, as for the information of the AC-BarringConfig, the eNodeB typically writes content in accordance with the degree of congestion of a network to be controlled by the eNodeB itself in the SIB2 to be put in a broadcast channel.

Figure 4:
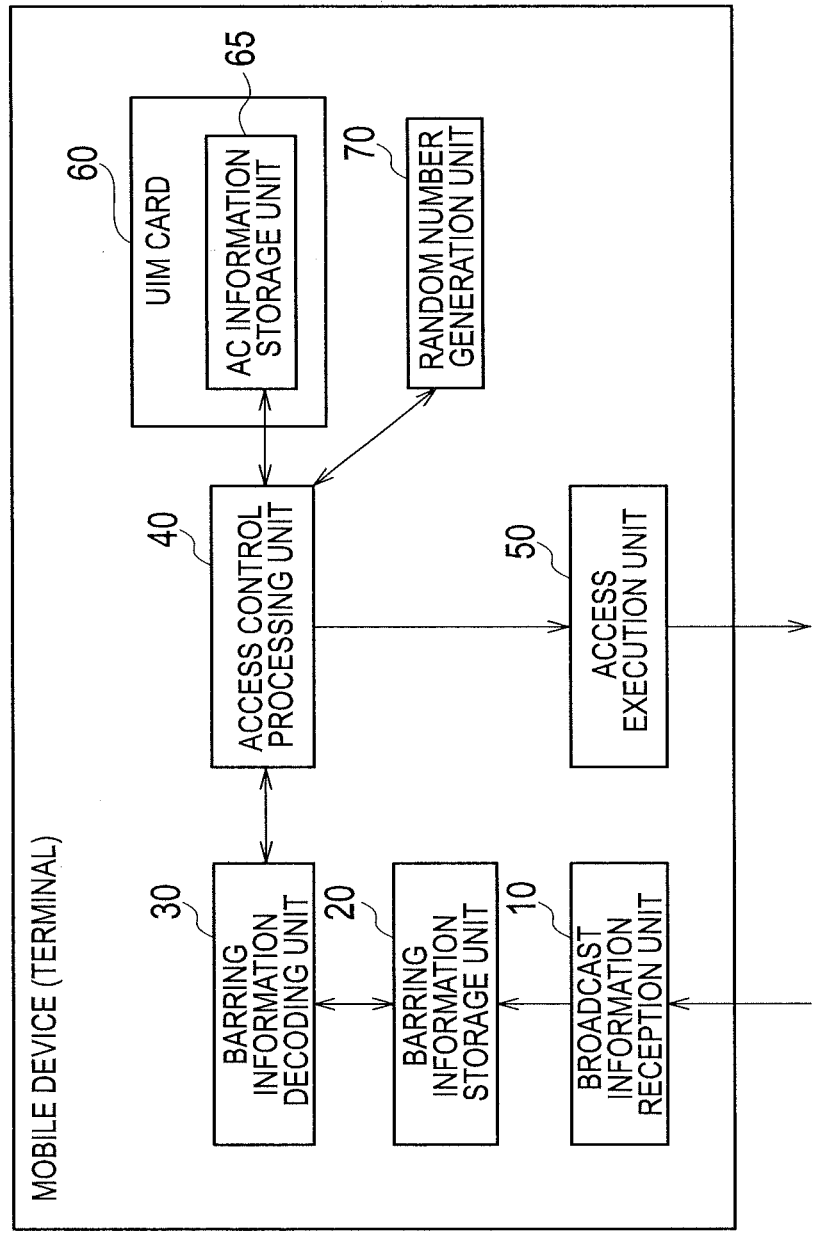
FIG. 4 is a block diagram illustrating an example of an internal configuration of a mobile device (terminal) in the present embodiment.
Figure 5:
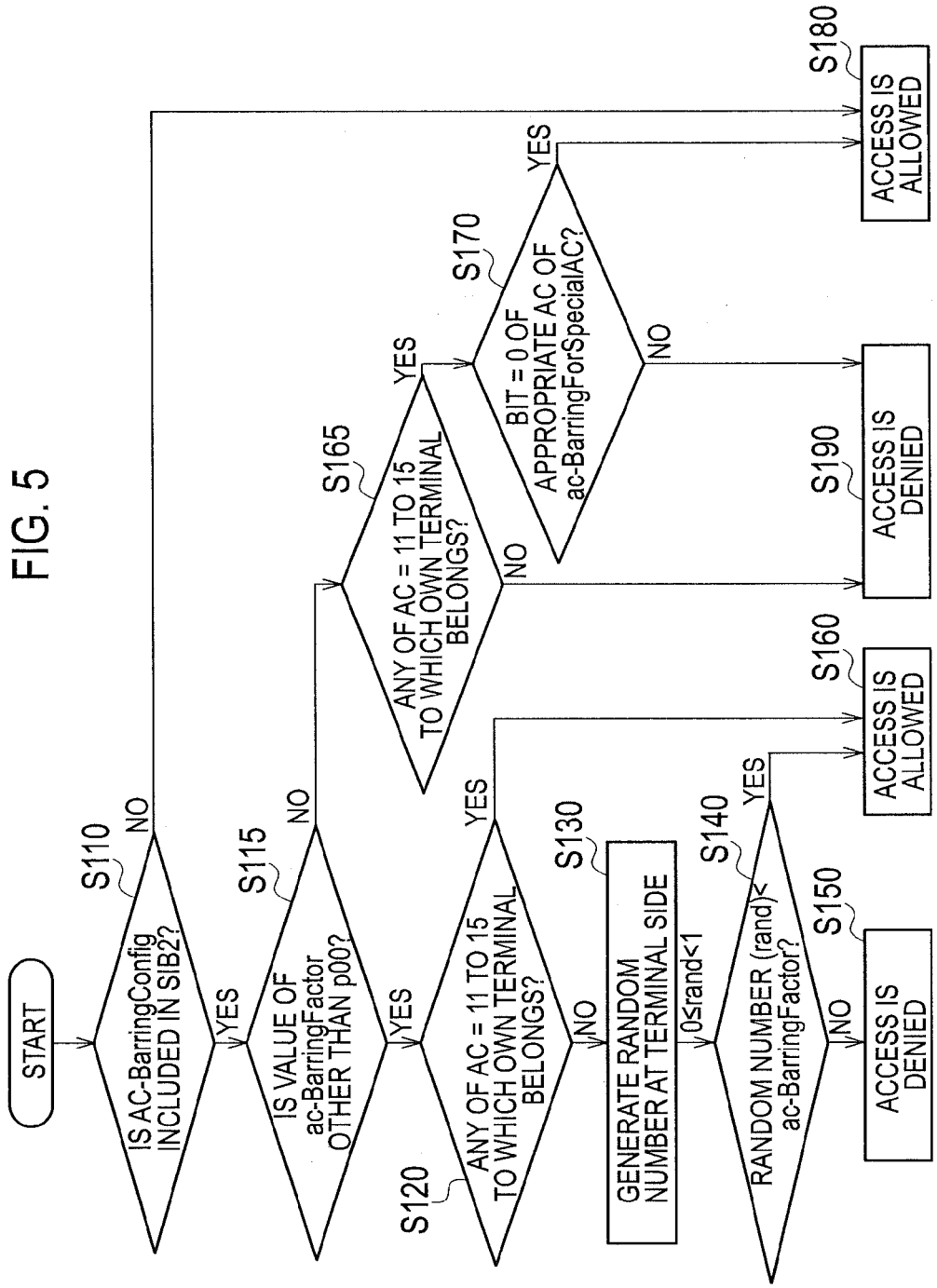
FIG. 5 is a flowchart illustrating an example of an operation of the mobile device (terminal) in the present embodiment.

An operation of a mobile device that has received the SIB2 broadcasted as described above will be described with reference to the block diagram of FIG. 4 and the flowchart of FIG. 5.

When starting the establishment of the RRC connection, first, the mobile device determines whether the SIB2 most recently received by a broadcast information reception unit 10 includes the AC-BarringConfig (S110). If the SIB2 does not include the AC-BarringConfig, the mobile device determines that an access is allowed (S180), and causes an access execution unit 50 to start a establishment procedure of the RRC connection.

When the SIB2 includes the AC-BarringConfig, the AC-BarringConfig is stored in a barring information storage unit 20. Therefore, a barring information decoding unit 30 first decodes an ac-BarringFactor. This information is an element in a head of the AC-BarringConfig, and therefore, if checking with the ASN.1 specification is performed from the head in order, a result can be obtained without referring to other elements.

An access control processing unit 40 determines whether the decoded ac-BarringFactor is p00 (information indicating 0% in which it always indicates that an access is denied when being compared with a random number) (S115). When the decoded ac-BarringFactor is information other than p00, it can be understood that the radio access network desires access barring in which, regarding mobile devices having only the normal type ACs, a mobile device, an access of which is allowed, and a mobile device, an access of which is denied, appear at a desired rate, rather than the accesses of the mobile devices being determined either allowed or denied in a strict manner.

That is, when the decoded ac-BarringFactor is information other than p00 (i.e., p05 to p95), there is a possibility in which while an access of a certain mobile device is denied by numerical values generated by the mobile devices, an access of another mobile device is allowed. Therefore, the access control processing unit 40 checks whether any of AC=11 to 15 is stored as the AC to which the own device belongs by referring to an AC information storage unit 65 in a user identification module (UIM) card 60 (S120).

When the own device only have a normal type AC (any of AC=11 to 15 is not stored), the access control processing unit 40 instructs a random number generation unit 70 to generate a random number (pseudo random number and the like) of 0 to 1 (exclusive of 1) (S130). Then, the access control processing unit 40 converts the information of the ac-BarringFactor (here, information indicating p05 to p95) to be the numerical values of 5% to 95% to be actually compared with the random number, and checks magnitude relation between the numerical value and the generated random number (S140).

For example, when the ac-BarringFactor indicates p60 (designated with intent to allow an access of 60% and to deny an access of 40%) and the random number is 45%, the access control processing unit 40 determines that an access is allowed because of 45<60 (S160), and the access execution unit 50 starts the establishment procedure of the RRC connection. In the same state, when the generated random number is 88%, the access control processing unit 40 determines that an access is denied because of 88>60 (S150).

When having determined that an access is denied, the access control processing unit 40 causes the barring information decoding unit 30 to decode information of subsequent ac-BarringTime stored in the barring information storage unit 20. Then, the access control processing unit 40 calculates a value to be set to the timer based on the information, and starts an operation from S110 again in order to start the establishment of the RRC connection again as required when the timer is expired. When the access control processing unit 40 determines that an access is denied in the above-described flow, the information of the subsequent ac-BarringForSpecialAC is not needed to decode.

When the own device stores any of the special type ACs (AC=11 to 15), the access control processing unit 40 determines that an access is allowed (S160) and starts the establishment procedure of the RRC connection by the access execution unit 50. In this case, the access control processing unit 40 determines that an access is allowed, and can reach the objective of the start of the RRC connection establishment without causing the random number generation unit 70 to generate a random number, without performing processing of converting the information of the ac-BarringFactor into a numerical value to be compared, and further, without performing decoding processing of the subsequent barring information such as the ac-BarringTime and the ac-BarringForSpecialAC.

When the decoded ac-BarringFactor is p00, there is not a possibility in which while an access of a certain mobile device is denied by the numerical values generated by the mobile devices, an access of another mobile device is allowed. Therefore, the access control processing unit 40 refers to the AC information storage unit 65 inside the UIM card 60, and checks whether any of AC=11 to 15 is stored as the AC to which the own device belongs (S165).

When the own device only has the normal type AC (any of AC=11 to 15 is not stored), the access control processing unit 40 determines that an access is denied (S190). Subsequent processing is as described above. When the access control processing unit 40 determines that an access is denied in this flow, the access control processing unit 40 can determine that an access is denied without decoding the information of the subsequent ac-BarringForSpecialAC, and further, without causing the random number generation unit 70 to generate a random number.

When the own device has any of the special type. ACs (any of AC=11 to 15 is stored), the access control processing unit 40 causes the barring information decoding unit 30 to decode the information of the subsequent ac-BarringForSpecialAC stored in the barring information storage unit 20. Then, the access control processing unit 40 checks a value of a bit corresponding to the special type AC to which the own device belongs (AC=12 if it is the UE#13 in the example of FIG. 1, AC=12 is the second bit in the example of FIG. 2, and the second bit value is "1" in the example of FIG. 2) (S170).

When the bit value corresponding to the special type AC to which the own device belong is "1", the access control processing unit 40 determines that there is barring and an access is denied (S190). Following that, the access control processing unit 40 sets the timer using decoded ac-BarringTime if information of the ac-BarringTime has already been decoded, or ac-BarringTime decoded by the barring information decoding unit 30 if information of the ac-BarringTime has not been decoded yet, to determine a period to prohibit the establishment of the RRC connection. In this case, even if the special type AC to which the own device belongs is designated to have barring in the ac-BarringForSpecialAC, the access control processing unit 40 can determine that an access is denied without causing the random number generation unit 70 to generate a random number.

Meanwhile, when the bit value corresponding to the special type AC to which the own device belongs is "0", the access control processing unit 40 determines that an access is allowed (S180) and starts the establishment procedure of the RRC connection by the access execution unit 50.

Figure 6:
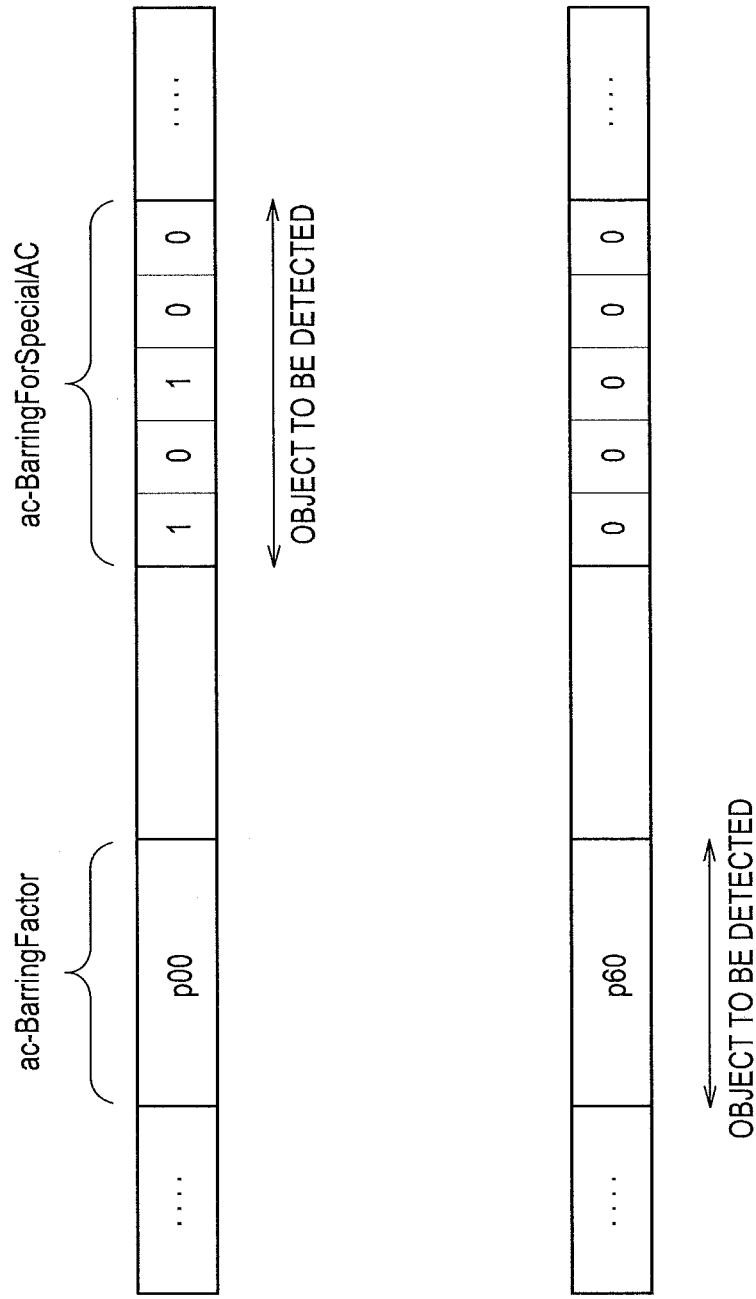
FIG. 6 is a diagram describing how the broadcast information of FIG. 2 is processed by the operation of the mobile device of FIG. 5.

With the above-described operation of the mobile device, the SIB2 broadcasted from the radio access network to the mobile device is handled as illustrated in FIG. 6.

FIG. 6 (*a*) illustrates a case in which p00 is broadcasted as the ac-BarringFactor, and the mobile device treats the ac-BarringForSpecialAC to be a detection target only in this case.

On the other hand, FIG. 6(*b*) illustrates a case in which information other than p00 is broadcasted as the ac-BarringFactor, and in this case, the mobile device operates as if "0" (no barring) is designated to all of the bit sequences regardless of which bit sequence is set to the ac-BarringForSpecialAC in the actually broadcasted SIB2.

That is, when the information other than p00 is broadcasted, the mobile device determines an access is allowed or denied based on only the information of the ac-BarringFactor, and does not refer to the ac-BarringForSpecialAC.

Then, when the information other than p00 is broadcasted, the mobile device determines that an access is allowed when having a special type AC, even if "1" is set to the ac-BarringForSpecialAC. Accordingly, the access barring such that the mobile device having a special type AC is always preferentially handled without being influenced by an operation or a malfunction of the radio access network can be realized.

Figure 7:
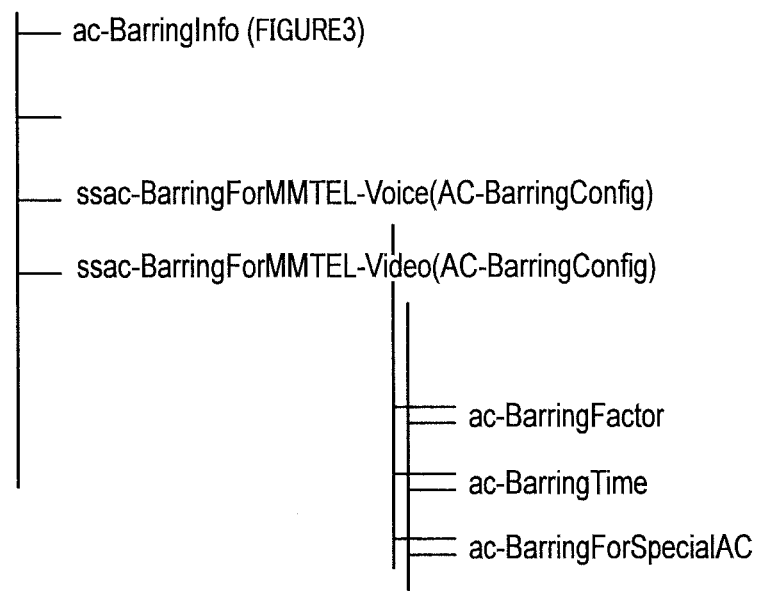
FIG. 7 is a diagram illustrating another example of a more detailed configuration of the information of FIG. 2.

As illustrated in FIG. 7, the SIB2 illustrated in FIG. 2 can also include one or more of ac-BarringInfo illustrated in FIG. 3, ssac-BarringForMMTEL-Voice (an information element to which a mobile device refers when establishing a communication session for IMS voice service), and ssac-BarringForMMTEL-Video (an information element to which a mobile device refers when establishing a communication session for IMS video service).

Both of the ssac-BarringForMMTEL-Voice and the ssac-BarringForMMTEL-Video include the AC-BarringConfig. A structure of the information of the AC-BarringConfig can be configured as the same structure as described for the ac-BarringInfo, and includes three elements: (1) ac-BarringFactor (an example of second barring information), (2) ac-BarringTime, and (3) ac-BarringForSpecialAC (an example of first barring information).

Figure 8:
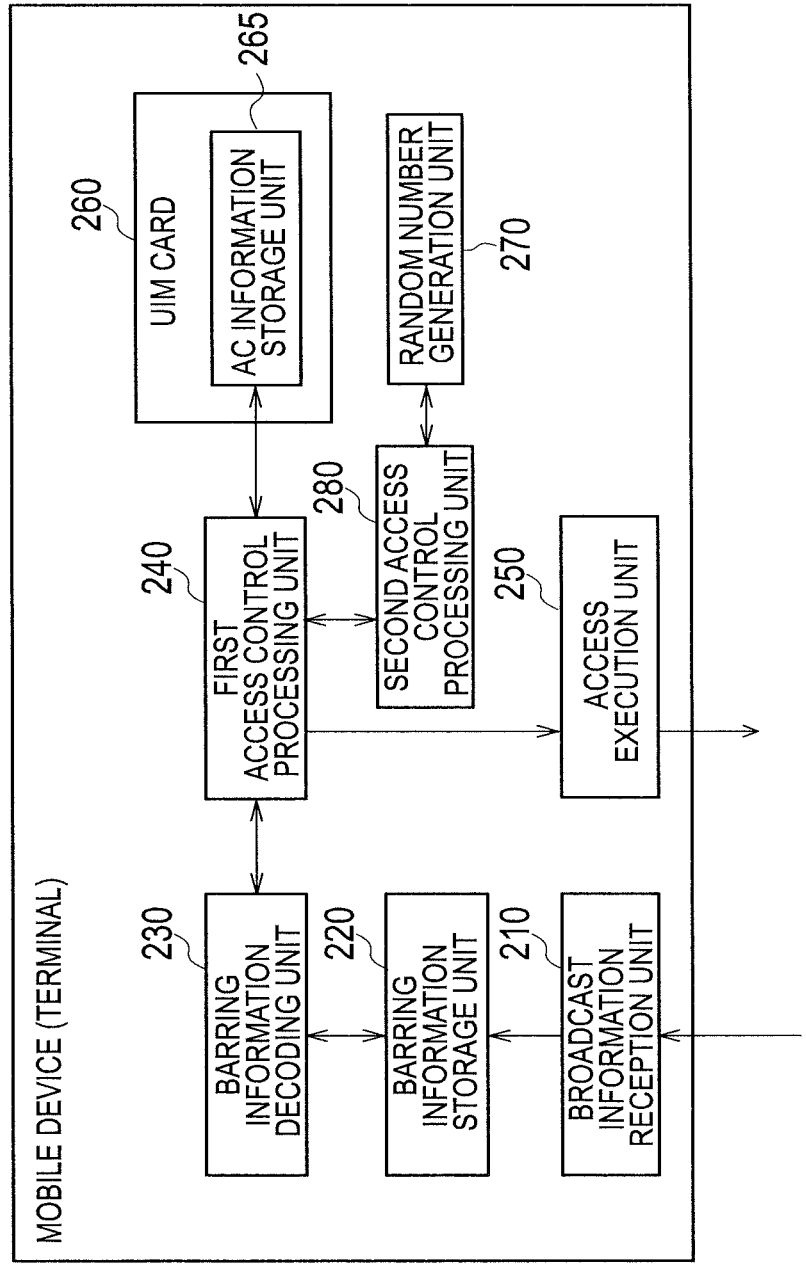
FIG. 8 is a block diagram illustrating another example of an internal configuration of the mobile device (terminal) in the present embodiment.

A mobile device that has received the SIB2 of FIG. 2 broadcasted can also operate as given below. An operation of the mobile device will be described with reference to the block diagram of FIG. 8 and the flowcharts of FIGS. 9 to 11.

First, the mobile device determines whether the SIB2 most recently received by a broadcast information reception unit 210 includes the AC-BarringConfig (S310). If the SIB2 includes the ssac-BarringForMMTEL-Voice and/or the ssac-BarringForMMTEL-Video, the mobile device can determine that the SIB2 includes the AC-BarringConfig. Such a determination can be made for example by a first access control processing unit 240 of the mobile device referring to the most recent SIB2 information retained in a barring information storage unit 220 via a barring information decoding unit 230. In addition, a determination may be made as to whether the present state of the mobile device is RRC_IDLE (a state in which the RRC connection is not set).

Figure 10:
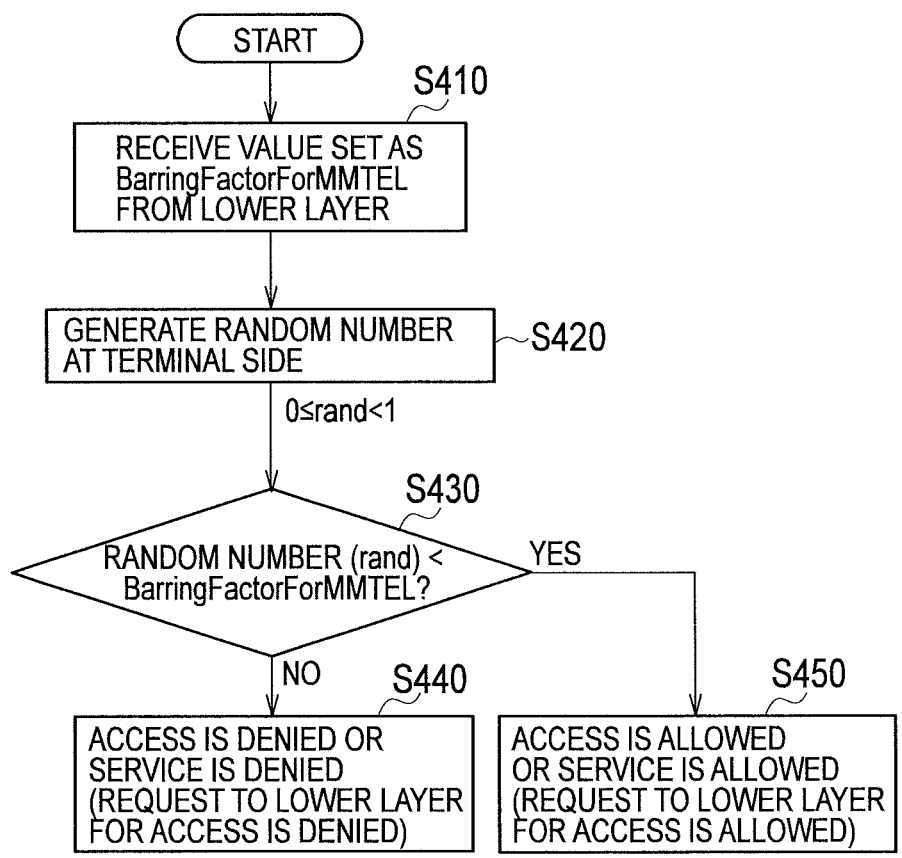
FIG. 10 is a flowchart illustrating still another example (a second processing unit side) of an operation of the mobile device (terminal) in the present embodiment.
Figure 11:
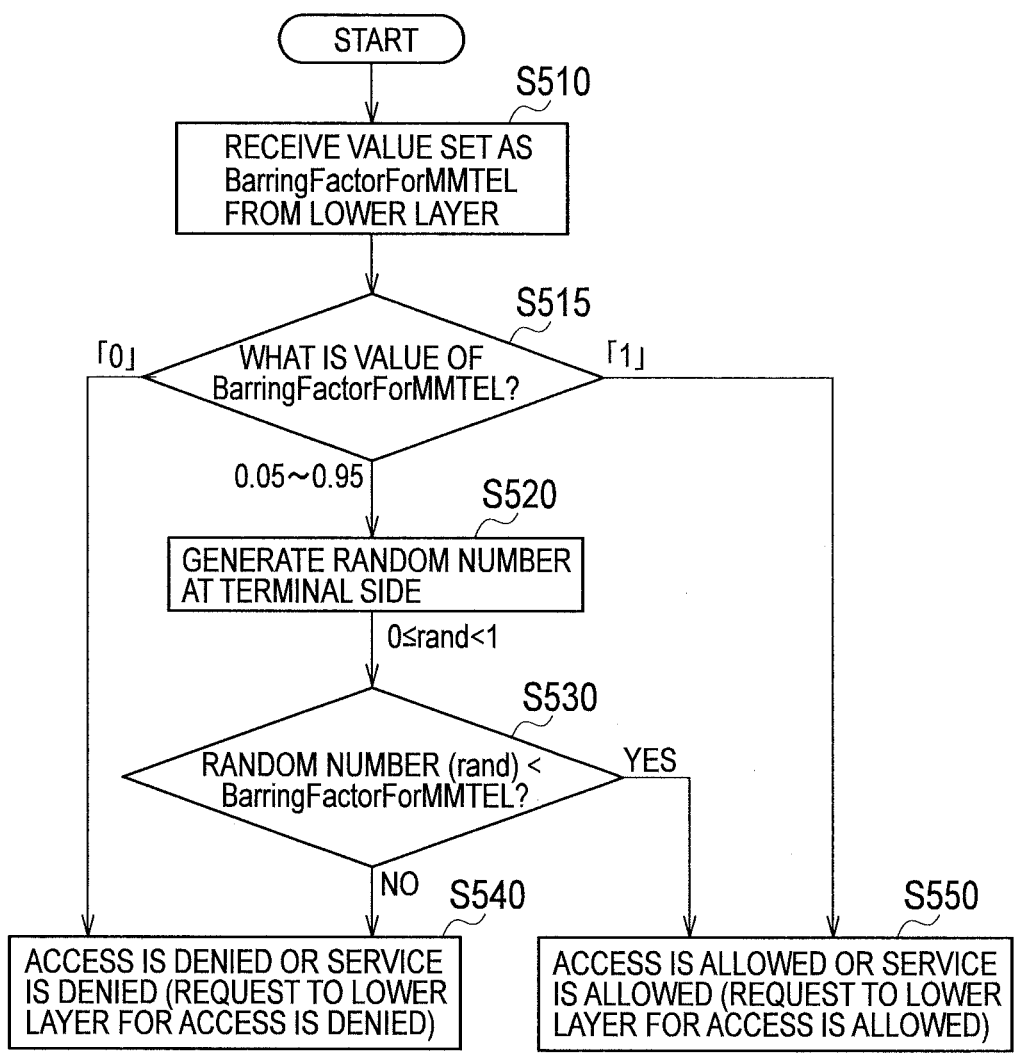
FIG. 11 is a flowchart illustrating a further example (the second processing unit side) of an operation of the mobile device (terminal) in the present embodiment.
Figure 12:
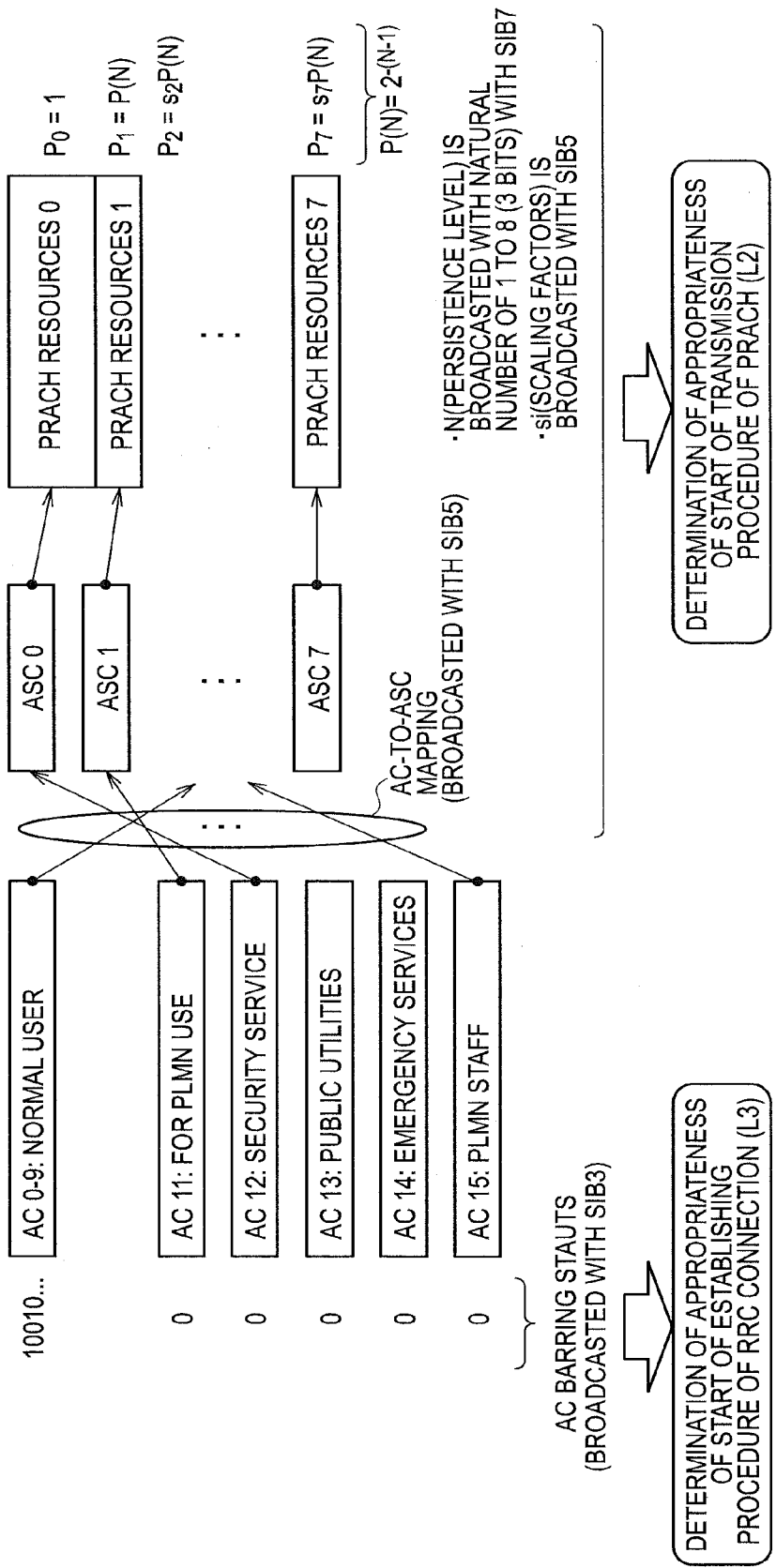
FIG. 12 is a diagram describing two-stage access barring in the W-CDMA.
Figure 13:
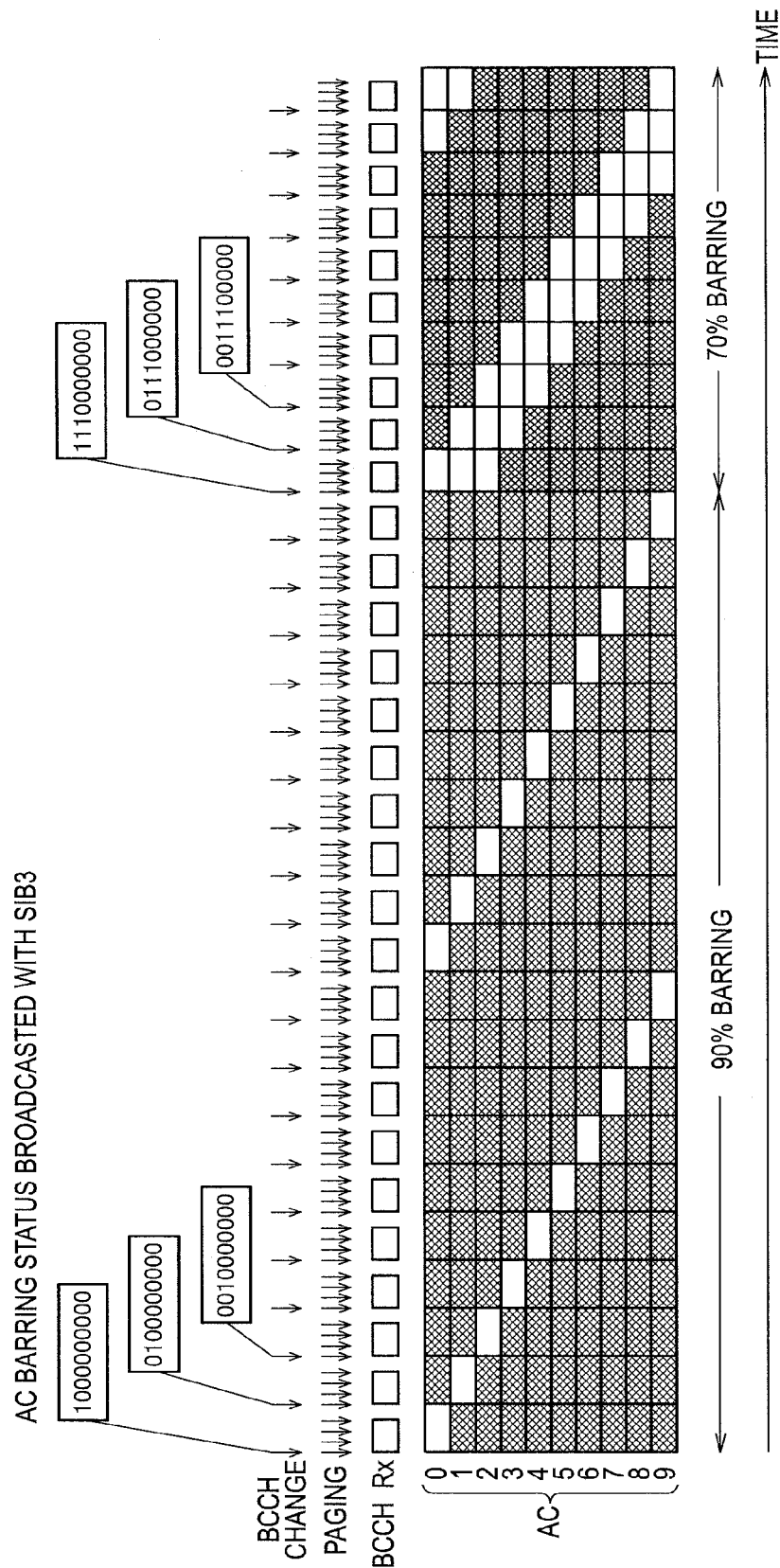
FIG. 13 is a diagram describing access barring in an L3 layer in the W-CDMA.
Figure 14:
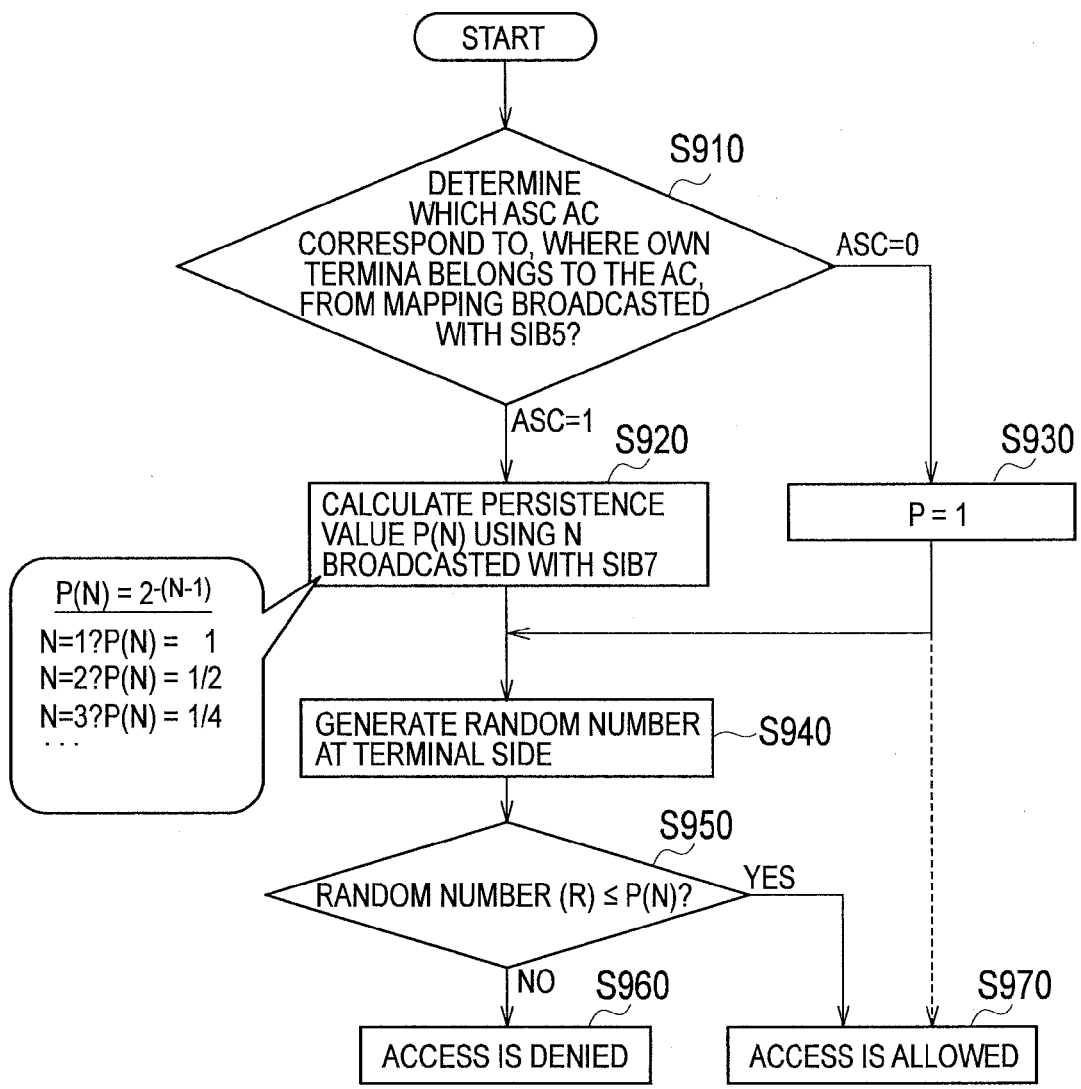
FIG. 14 is a diagram describing access barring in an L2 layer in the W-CDMA.
Figure 15:
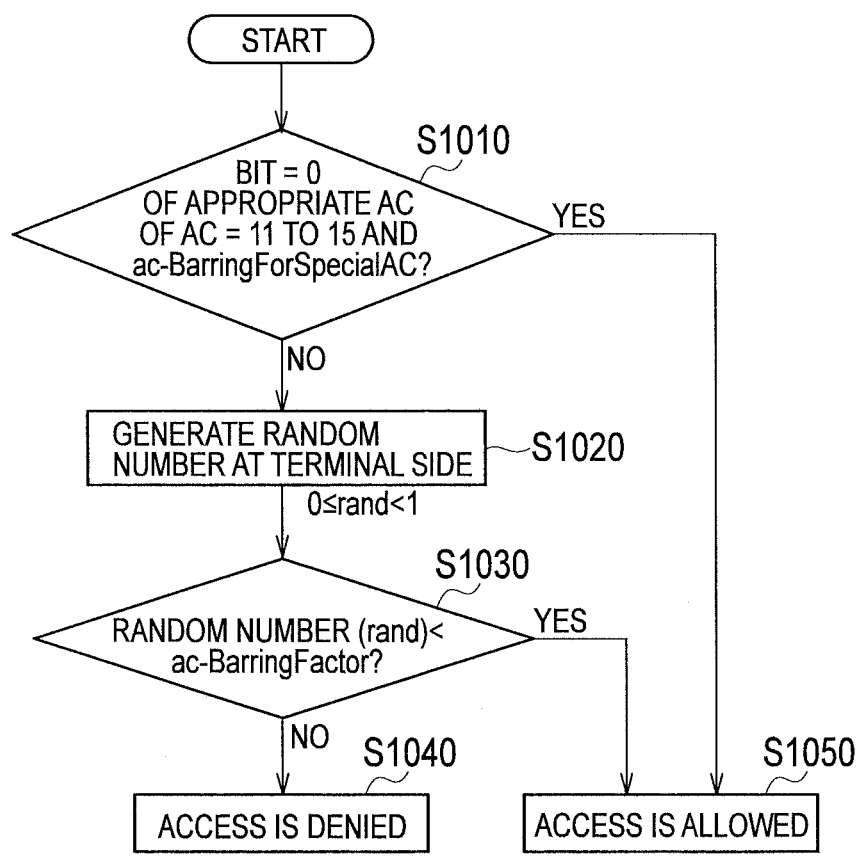
FIG. 15 is a flowchart describing an existing access barring method in LTE.

In the above-described example, if the condition that the SIB2 includes the AC-BarringConfig and the mobile device is in the RRC_IDLE state is not satisfied, the value "1" is set as a parameter (in the above-described example, BarringFactorForMMTEL-Voice and/or BarringFactorForMMTEL-Video) to be passed to a second access control processing unit 280 (in the above-described example, an upper-layer processing unit involved in establishing a communication session for specific service such as IMS voice or a videophone) which performs processing illustrated in FIG. 10 or 11 (S380).

The second access control processing unit 280, whether it operates as illustrated in FIG. 10 or it operates as illustrated in FIG. 11, performs predetermined processing which involves comparing a reference value having a possibility that an access of a certain mobile device is denied while an access of another mobile device is allowed (for example, values at intervals of 0.05 or 0.1 between 0.05 and 0.95), with a random number (for example, a number between 0 inclusive and 1 exclusive) generated by the mobile device (S430, S530), determining that an access is allowed or a session establishment is allowed if the random number is smaller than the reference value (S450, S550), and determining that an access is denied or a session establishment is denied if the random number is equal to or larger than the reference value (S440, S540). Here, generation of the random number (S420, S520) can be performed by the second access control processing unit 280 using a random number generation unit 270.

Previous to performing the above-mentioned predetermined processing, the second access control processing unit 280 receives the value of the parameter (in the above-described example, the BarringFactorForMMTEL-Voice and/or the BarringFactorForMMTEL-Video) set by the first access control processing unit 240 (in the above-described example, a lower-layer processing unit involved in establishing the RRC connection) (S410, S510). Possible values of the parameter include the reference value for use in the above-mentioned predetermined processing (refer to the branch "0.05 to 0.95" of S515), a value determined that an access is allowed or a session establishment is allowed without performing the predetermined processing (refer to the branch "1" of S515), and a value determined that an access is denied or a session establishment is denied without performing the predetermined processing (refer to the branch "0" of S515).

In short, in the above-described example, if the SIB2 does not include the AC-BarringConfig or if the mobile device is not in the RRC_IDLE state, the parameter which the first access control processing unit 240 passes to the second access control processing unit 280 is set to the value "1" (S380), and thus, a determination is made that an access is allowed or a session establishment is allowed without performing the above-described predetermined processing.

The second access control processing unit 280 may determine appropriateness of a session establishment by referring to the value of the BarringFactorForMMTEL-Voice set by the first access control processing unit 240 when a mobile device starts establishing a communication session for IMS voice service, or may determine appropriateness of a session establishment by referring to the value of the BarringFactorForMMTEL-Video set by the first access control processing unit 240 when a mobile device starts establishing a communication session for IMS video service. In this case, the determination of the appropriateness of a session establishment indicates appropriateness of provision of each specific service.

Also, when the second access control processing unit 280 determines that a session establishment is allowed (S450, S550), a determination may be immediately made that an access is allowed, and the first access control processing unit 240 may instruct an access execution unit 250 to start the establishment procedure of the RRC connection; however, the first access control processing unit 240 may determine appropriateness of an access by a weighting approach using the ac-BarringInfo illustrated in FIG. 3, and then, if a determination is made that an access is allowed, the first access control processing unit 240 may provide an instruction to the access execution unit 250. In the latter case, determining the appropriateness of a session establishment determines appropriateness of the upper layer requesting the lower layer to set the RRC connection, rather than appropriateness of start of the establishment procedure of the RRC connection.

When the second access control processing unit 280 determines that a session establishment is denied (S440, S540), in the above-described example, the RRC connection cannot be set for a communication session for specific service to be established.

Figure 9:
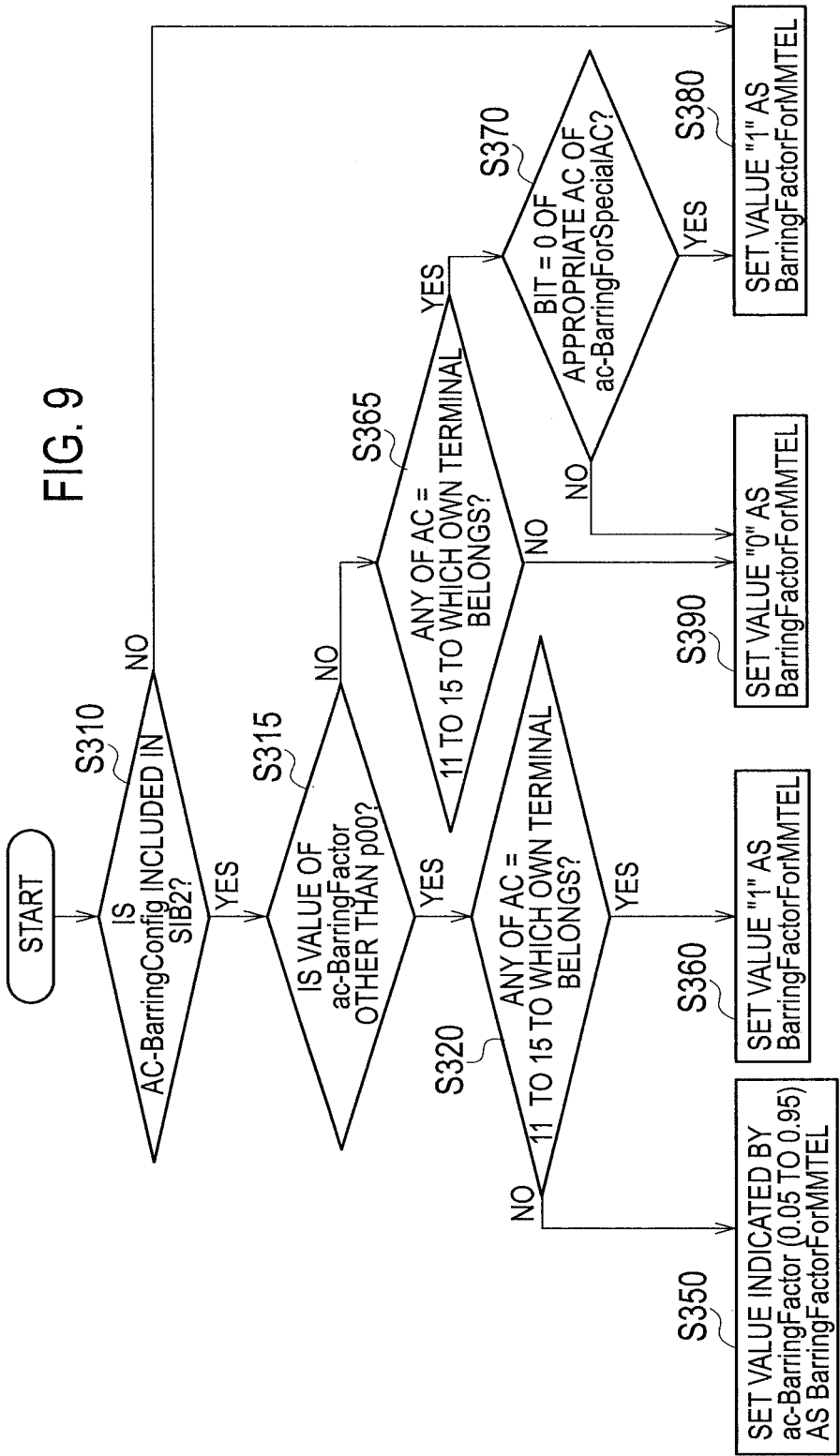
FIG. 9 is a flowchart illustrating another example (a first processing unit side) of an operation of the mobile device (terminal) in the present embodiment.

Returning to description of an operation of the first access control processing unit 240 of FIG. 9, when the SIB2 includes the AC-BarringConfig (and the mobile device is in the RRC_IDLE state), the AC-BarringConfig is stored in the barring information storage unit 220. Therefore, the barring information decoding unit 230 first decodes an ac-BarringFactor.

Then, the first access control processing unit 240 determines whether the decoded ac-BarringFactor is p00 (information indicating 0% in which it always indicates that an access is denied when being compared with a random number) (S315). When the decoded ac-BarringFactor is information other than p00 (i.e., p05 to p95), the first access control processing unit 240 checks whether any of AC=11 to 15 is stored as the AC to which the own device belongs by referring to an AC information storage unit 265 in a user identification module (UIM) card 260 (S320).

When the own device only has a normal type AC (any of AC=11 to 15 is not stored), the first access control processing unit 240 sets a value indicated by the ac-BarringFactor (values between 0.05 and 0.95 corresponding to p05 to p95) as the parameter (in the above-described example, the BarringFactorForMMTEL-Voice and/or the BarringFactorForMMTEL-Video) to be passed to the second access control processing unit 280 (S350). In this case, as mentioned above, the second access control processing unit 280 performs the predetermined processing which involves determining appropriateness of an access or appropriateness of a session establishment according to the relative magnitudes of a reference value and a random number, in which the reference value has a possibility that an access of a certain mobile device is denied while an access of another mobile device is allowed, and the random number is generated by the mobile device.

Incidentally, when a determination is made that a session establishment is denied (S440, S540), the second access control processing unit 280 may calculate a value to be set in the timer based on information of BarringTimeForMMTEL thereby to, while the timer operates, determine that a session establishment is denied even if a request to establish a communication session for specific service is received again from an application. Also, if timer runout occurs in the set timer, the start of establishment of the communication session for the specific service may be retried as required. A value for Voice and a value for Video may be held as the information of the BarringTimeForMMTEL so that the timer is set by referring to a value according to service of a communication session to be established (literature cited: 3GPP TS24.173). The information of the BarringTimeForMMTEL can be held in the following manner: specifically, the barring information decoding unit 230 decodes ac-BarringTime from among the AC-BarringConfig stored in the barring information storage unit 220, and the first access control processing unit 240 passes a decoded value to the second access control processing unit 280.

When the own device has any of the special type ACs (any of AC=11 to 15 is stored), the first access control processing unit 240 sets the parameter to be passed to the second access control processing unit 280 to the value "1" (S360). Thereby, the second access control processing unit 280 determines that an access is allowed or a session establishment is allowed (S450, S550) without performing the above-mentioned predetermined processing.

When the decoded ac-BarringFactor is p00, there is not a possibility in which while an access of a certain mobile device is denied by the numerical values generated by the mobile devices, an access of another mobile device is allowed. Therefore, the first access control processing unit 240 refers to the AC information storage unit 265 inside the UIM card 260, and checks whether any of AC=11 to 15 is stored as the AC to which the own device belongs (S365).

When the own device only has the normal type AC (any of AC=11 to 15 is not stored), the first access control processing unit 240 sets the parameter to be passed to the second access control processing unit 280 to the value "0" (S390). Thereby, the second access control processing unit 280 determines that an access is denied or a session establishment is denied (S440, S540).

When the own device has any of the special type ACs (any of AC=11 to 15 is stored), the first access control processing unit 240 causes the barring information decoding unit 230 to decode the information of the subsequent ac-BarringForSpecialAC stored in the barring information storage unit 220. Then, the first access control processing unit 240 checks a value of a bit corresponding to the special type AC to which the own device belongs (AC=12 if it is the UE#13 in the example of FIG. 1, AC=12 is the second bit in the example of FIG. 2, and the second bit value is "1" in the example of FIG. 2) (S370).

When the bit value corresponding to the special type AC to which the own device belongs is "1", the first access control processing unit 240 sets the parameter to be passed to the second access control processing unit 280 to the value "0" (S390). Meanwhile, when the bit value corresponding to the special type AC to which the own device belongs is "0", the first access control processing unit 240 sets the parameter to be passed to the second access control processing unit 280 to the value "1" (S380).

Also with the above-described operation of the mobile device, the SIB2 broadcasted from the radio access network to the mobile device is handled as illustrated in FIG. 6.

Incidentally, use of the BarringFactorForMMTEL-Voice, the BarringFactorForMMTEL-Video, or the like, as given above by way of example, enables barring each call at a rate determined according to the type of service (application) in accordance with the specific congestion state of the network, a policy about which communication for service is to be preferentially established, or the like. For example, while communication of preferential call can be ensured by setting high a barring rate of call for IMS voice or IMS video, other calls (calls for data) can be allowed with best effort. The barring rate of voice call (the call for IMS voice) can also be different from that of videophone call (the call for IMS video).

While an embodiment of the present invention has been described above, it is apparent that a person skilled in the art can perform various modifications and applications of the above-described embodiment within the scope of the present invention.

Note that the entire contents of Japanese Patent Application No. 2012-116680 (filed on May 22, 2012) are incorporated by reference in the present specification.

INDUSTRIAL APPLICABILITY

As described above, according to the present invention, access barring can be realized in a mobile device, in which a mobile device having a special type access class is always preferentially handled without depending on an operation of a radio access network connected thereto.

EXPLANATION OF THE REFERENCE NUMERALS 10, 210 broadcast information reception unit
20, 220 barring information storage unit
30, 230 barring information decoding unit access control processing unit
50, 250 access execution unit
60, 260 UIM card
65, 265 AC information storage unit
70, 270 random number generation unit
240 first access control processing unit
280 second access control processing unit

The invention claimed is:

1. A method of barring a network access performed in a mobile device connectable to a radio access network and capable of establishing a communication session, the method comprising:
broadcasting, by the radio access network, broadcast information to each mobile device that includes barring information for barring an access to the network,
wherein
each mobile device connectable to the radio access network belongs to at least one of access classes,
the access classes include a special type access class and a normal type access class,
the barring information includes first barring information for designating whether a mobile device in each access class is subjected to access barring, and second barring information indicating a value serving as a reference for determining appropriateness of an access according to a relationship with a numerical value generated by each mobile device, and
values of the reference indicated by the second barring information includes a first type value indicating that, depending on numerical values generated by mobile devices subjected to access barring, an access of a certain mobile device is denied while an access of another mobile device is allowed, and a second type value other than the first type value,
determining, by the mobile device, if the reference is the first type value or the second type value,
determining, by the mobile device, when the mobile device determines that the reference is the first type value, whether the mobile device station has the special type access class, without referring to designation by the first barring information,
performing, by the mobile device, when the mobile device does not have the special type access class, predetermined processing that determines appropriateness of an access or appropriateness of a session establishment by comparing the value indicated by the second barring information with the numerical value generated by the mobile device itself, and
determining, by the mobile device, when the mobile device has the special type access class, allowance of an access or allowance of a session establishment without performing the predetermined processing; and
determining, by the mobile device, when the mobile device determines that the reference is the second type value, the appropriateness of an access or the appropriateness of a session establishment based on designation by the first barring information when the mobile device has the special type access class, and denying, by the mobile device, access or a session establishment when the mobile device does not have the special type access class.

2. The method of barring a network access according to claim 1, wherein, when the value serving as the reference is a value determining that an access is denied regardless of the numerical value generated by the mobile device, the reference indicated by the second barring information is determined to be the second type value.

3. The method of barring a network access according to claim 1, wherein the value serving as the reference is determined based on a percentage of mobile devices, accesses of which are desired to allow in the network, and the numerical value generated by each mobile device is a number functioning as a random number.

4. The method of barring a network access according to claim 1, wherein
the barring information includes barring information for determining appropriateness of an access, and barring information for determining appropriateness of a session establishment, and
the mobile device determines the appropriateness of an access based on the barring information for determining the appropriateness of an access when allowance of a session establishment is determined based on the barring information for determining the appropriateness of a session establishment, and determines that an access is denied when denial of a session establishment is determined.

5. The method of barring a network access according to claim 1, wherein the mobile device starts a procedure for establishing a communication session for specific service provided through the network in accordance with a determination that a session establishment is allowed.

6. The method of barring a network access according to claim 1, wherein the mobile device starts an establishment procedure of radio resource control (RRC) connection to the network in accordance with the determination that an access is allowed.

7. The method of barring a network access according to claim 1, wherein the radio access network operates according to Long Term Evolution (LTE).

8. A mobile device connectable to a radio access network and capable of establishing a communication session, wherein
each mobile device connectable to the radio access network belongs to at least one of access classes, and
the access classes include a special type access class and a normal type access class,
the mobile device comprising:
a reception unit that receives broadcast information broadcasted from the radio access network;
a storage unit that takes out from the broadcast information and stores barring information for barring an access to the network, and including first barring information for designating whether a mobile device in each access class is subjected to access barring, and second barring information indicating a value serving as a reference for determining appropriateness of an access according to a relationship with a numerical value generated by each mobile device;
a memory unit that stores information indicating the at least one access class to which the mobile device itself belongs;
a generation unit selects one of a plurality of numerical values every time generation of a numerical value is instructed, and generates the selected value as a numerical value at the time of instruction; and
a determination unit that determines whether the reference is a first type value or a second type value other than the first type value, wherein
when the determination unit determines that the reference is the first type value, the determination unit determines whether the memory unit stores information indicating the special type access class, without referring to designation by the first barring information
when the memory unit does not store the information indicating the special type access class, the determination unit performs predetermined processing that determines appropriateness of an access or appropriateness of a session establishment by comparing the value indicated by the second barring information with the numerical value generated by the generation unit, and
when the memory unit stores the information indicating the special type access class, the determination unit determines allowance of an access or allowance of a session establishment without performing the predetermined processing as a value for determining appropriateness of an access or appropriateness of a session establishment
when the determination unit determines the reference is the second type value, the determination unit determines the appropriateness of an access or the appropriateness of a session establishment based on designation by the first barring information when the memory unit stores the information indicating the special type access class, and determine that an access is denied or a session establishment is denied when the memory unit does not store the information indicating the special type access class, and
the first type value indicates that, depending on numerical values generated by mobile devices subjected to access barring, an access of a certain mobile device is denied while an access of another mobile device is allowed.

* * * * *